W. H. & T. DULANEY.
Butter-Shaper.

No. 199,697. Patented Jan. 29, 1878.

WITNESSES:
C. Neveux
J. H. Scarborough

INVENTORS
W. H. Dulaney
T. Dulaney
BY Munn & Co.
ATTORNEYS.

UNITED STATES PATENT OFFICE.

WILLIAM H. DULANEY AND THEOPHILUS DULANEY, OF PETERSTOWN, WEST VIRGINIA.

IMPROVEMENT IN BUTTER-SHAPERS.

Specification forming part of Letters Patent No. 199,697, dated January 29, 1878; application filed November 26, 1877.

*To all whom it may concern:*

Figure 1:
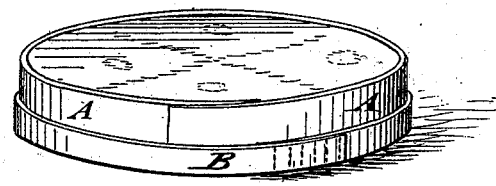
Figure 2:
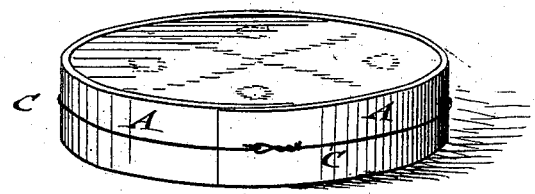

Be it known that we, WILLIAM H. DULANEY and THEOPHILUS DULANEY, of Peterstown, in the county of Monroe and State of West Virginia, have invented a new and Improved Butter-Shaper, of which the following is a specification:

In the accompanying drawings, Figure 1 represents a perspective view of our improved butter-shaper, shown in the forming-hoop, with the butter stamped into the shaper; and Fig. 2 is a perspective view of the butter-shaper ready for use.

Similar letters of reference indicate corresponding parts.

The invention will first be described, and then pointed out in the claim.

Referring to the drawings, A represents a wooden band or hoop, and with tapering ends, which overlap each other, so as to inclose a circular space. This band is placed into a ring-shaped former, B, of less height, which is made by sewing together or otherwise firmly connecting its overlapping ends.

When the band A is in position in the former B it is filled with butter and the same stamped therein, a wire band, C, being then placed around the shaper A, so as to hold the same together after it is removed from the forming-hoop.

The wire band C is preferably made of galvanized iron, so as to be non-corrosive by use.

The butter may, by the use of the shaper, be furnished in fixed quantities from one-half a pound upward, and thereby conveniently shipped, handled, and sold, having an attractive appearance, as the stamp and shape are preserved by the shaper.

After the butter has been stamped, the ring-shaped former B removed, and the wire C made fast about the band A, the latter, with its contents, is ready for transportation.

The band A enables the butter to retain its shape during transportation, and afterward may be removed, on sale to the consumer, or go with the butter, as its cost is very trifling.

Having thus described our invention, we claim as new and desire to secure by Letters Patent—

The method herein described of preparing butter for market, consisting in placing a circular band or hoop with overlapping ends into a ring-shaped former, then filling and stamping the butter into the band, and finally securing band and stamped butter by a suitable retaining device, substantially as set forth.

W. H. DULANEY.
THEO. DULANEY.

Witnesses:
J. L. FOSTER,
L. F. CLARK.